(12) United States Patent
Jin et al.

(10) Patent No.: US 11,774,336 B2
(45) Date of Patent: Oct. 3, 2023

(54) FRICTION AND WEAR TESTING PLATFORM CAPABLE OF SIMULATING HIGH-PRESSURE, SILT-CONTAINING AND TURBID SUBMARINE ENVIRONMENT

(71) Applicant: HUNAN UNIVERSITY OF SCIENCE AND TECHNOLOGY, Xiangtan (CN)

(72) Inventors: Yongping Jin, Xiangtan (CN); Zhaodong Tong, Xiangtan (CN); Buyan Wan, Xiangtan (CN)

(73) Assignee: HUNAN UNIVERSITY OF SCIENCE AND TECHNOLOGY, Xiangtan (CN)

( * ) Notice: Subject to any disclaimer, the term of this patent is extended or adjusted under 35 U.S.C. 154(b) by 0 days.

(21) Appl. No.: 17/719,326

(22) Filed: Apr. 12, 2022

(65) Prior Publication Data
US 2022/0236159 A1  Jul. 28, 2022

(30) Foreign Application Priority Data
Mar. 7, 2022 (CN) .......................... 202210214709.6

(51) Int. Cl.
*G01N 3/56* (2006.01)
(52) U.S. Cl.
CPC .................................. *G01N 3/567* (2013.01)

(58) Field of Classification Search
CPC ........... G01N 3/567; G01N 2203/0232; G01N 2203/024; G01N 3/56; G01N 17/002; G01N 19/02; G01N 3/02; G01N 17/00; F16J 15/02; F16J 15/40
USPC .......... 73/7, 9, 794, 841, 843, 847, 854, 866
See application file for complete search history.

(56) References Cited

FOREIGN PATENT DOCUMENTS

| CN | 112986034 A | * | 6/2021 | ............. G01N 17/02 |
| CN | 114252351 A | * | 3/2022 | |

* cited by examiner

*Primary Examiner* — Robert R Raevis (57) ABSTRACT

A friction and wear testing platform capable of simulating high-pressure, silt-containing and turbid submarine environment, including a tank, a loading device, a partition plate, a partition cylinder, a top sealing sleeve, a bottom sealing sleeve, a rotating shaft, an inner magnetic cylinder, an outer magnetic cylinder and a centering table. The partition plate and the partition cylinder divide an inner chamber of the tank into a test chamber and a pressure compensation chamber. The rotating shaft penetrates the pressure compensation chamber; two ends of the rotating shaft are sealed by the top and bottom sealing sleeves, respectively, as well as sealing bearings and rings therein. The loading device drives the rotating shaft to rotate, and the rotating shaft drives the inner magnetic cylinder to rotate. The centering table is driven through the magnetic coupling between the inner and outer magnetic cylinders to install a test piece.

10 Claims, 6 Drawing Sheets

FRICTION AND WEAR TESTING PLATFORM CAPABLE OF SIMULATING HIGH-PRESSURE, SILT-CONTAINING AND TURBID SUBMARINE ENVIRONMENT

CROSS-REFERENCE TO RELATED APPLICATIONS

This application claims the benefit of priority from Chinese Patent Application No. 202210214709.6, filed on Mar. 7, 2022. The content of the aforementioned application, including any intervening amendments thereto, is incorporated herein by reference in its entirety.

TECHNICAL FIELD

This application relates to friction and wear testing machines, and more specifically to a friction and wear testing platform capable of simulating a high-pressure, silt-containing and turbid submarine environment.

BACKGROUND

In view of the frictional movement between parts inevitably occurring during the operation of the equipment, a desired wear-resistant material is of great significance in the machinery and equipment development. Since there are a variety of salts and biological by-products in the natural seawater, the friction mechanism of materials in the marine environment is often quite different from that on land. For example, for a pressure pump adopting the advanced wear-resistant materials, it still suffers serious wear when exposed to a complex marine environment with high pressure, strong corrosion, diverse particulate matters and negative pressure. Therefore, it is extremely important to explore the friction mechanism of materials in the marine environment.

However, the existing friction and wear testing machines cannot simulate the ultra-high-pressure silt-carrying seawater environment, nor the submarine negative pressure. Chinese Patent Publication No. 106323789 A discloses a loading and measuring device of a friction and wear testing platform for simulating a full-ocean-depth environment, in which an annular loading cylinder is adopted to achieve the same-side and heteroaxial loading. In addition, the device is sealed in a non-contact way, which eliminates an interference of the contact seal on the transmission and measurement of the friction torque. However, the testing platform still struggles with the following limitations: (1) due to the low viscosity of seawater, the autoclave will suffers a large leakage; (2) the annular loading cylinder needs to withstand a high pressure from the seawater, resulting in an attenuated loading performance; and (3) the non-contact sealing cannot arrive at an absolute sealing, and cannot avoid the wear of particles on the bearing. As a consequence, this testing platform fails to simulate a high-pressure silt-containing marine environment, and also the marine negative pressure.

In addition, some friction and wear testing machines adopt a permanent-magnetic loading strategy, which can eliminate the leakage and sealing resistance. However, the autoclave wall often has a relatively large thickness, while the magnetic transmission requires a thinner autoclave wall. In this case, the loading efficiency and capacity will be reduced, and the ultra-high pressure environment cannot be simulated. Therefore, it is of great practical significance to develop a friction and wear testing machine that can simulate an ultra-high pressure and turbid submarine environment and a negative pressure seawater environment.

SUMMARY

In order to solve the above technical problems, the present disclosure provides a friction and wear testing platform capable of simulating high-pressure, silt-containing and turbid submarine environment. The friction and wear testing platform provided herein has simple structure and easy operation, and can simulate any real marine environment, such as negative pressure, ultra-high pressure and submarine silt-containing environment, and thus can be applied to the accurate exploration of the friction and wear mechanism of a test sample under a submarine environment.

The technical solutions of the present disclosure are described as follows.

This application provides a friction and wear testing platform capable of simulating a high-pressure, silt-containing and turbid submarine environment, comprising:
  a tank;
  a loading device;
  a partition plate;
  a partition cylinder;
  a top sealing sleeve;
  a bottom sealing sleeve;
  a rotating shaft;
  an inner magnetic cylinder;
  an outer magnetic cylinder; and
  a centering table;
  wherein the top sealing sleeve and the bottom sealing sleeve are coaxially provided on the tank;
  the partition plate is fixedly arranged in the tank to divide an inner chamber of the tank into a test chamber and a pressure compensation chamber; the test chamber is provided with a water inlet and a gas discharge port; the pressure compensation chamber is provided with an oil inlet; the partition plate is provided with a hole coaxial with the top sealing sleeve; and one end of the partition cylinder is fixedly arranged in the hole of the partition plate, and the other end of the partition cylinder is fixedly arranged in a center hole of the top sealing sleeve;
  the tank is provided with a rotating shaft hole; the rotating shaft hole is coaxial with the bottom sealing sleeve; the bottom sealing sleeve is arranged on a position of an outer wall of the tank where the rotating shaft hole is located; one end of the rotating shaft is supported in a hole of the top sealing sleeve through a first sealing bearing, and the other end of the rotating shaft is configured to pass through the partition cylinder, the partition plate and the bottom sealing sleeve to connect the loading device; the rotating shaft is supported in the rotating shaft hole and a center hole of the bottom sealing sleeve through a second sealing bearing; the inner magnetic cylinder is sleeved on the rotating shaft; the outer magnetic cylinder is sleeved on the partition cylinder; a gap is left between an outer wall of the inner magnetic cylinder and an inner wall of the partition cylinder; one end of the outer magnetic cylinder is fixedly arranged on the partition plate through a first sliding bearing, and the other end of the outer magnetic cylinder is fixedly arranged on the top sealing sleeve through a second sliding bearing; the centering table is fixedly arranged on the outer magnetic cylinder, and is located in the test chamber; and the centering table is configured to install a first test piece.

In an embodiment, the tank comprises a tank cover and a tank body; the tank cover is arranged at an opening of the tank body via a positioning pin; a first sealing ring is arranged between the tank cover and the tank body; the tank cover and the tank body are fixedly connected via a clamp; a center of the tank cover is provided with a tapered hole; a larger end of the tapered hole is close to the test chamber; the top sealing sleeve is arranged in the tapered hole, and fixed via a first fastening nut; a second sealing ring is arranged between the top sealing sleeve and the tapered hole; the water inlet and the gas discharge port are arranged on a side wall of the tank body; the oil inlet is arranged on a bottom plate of the tank body; the partition plate is parallel to the bottom plate of the tank body; a heat sink is arranged on the partition plate; and the hole of the partition plate is located at a center of the partition plate.

In an embodiment, an end of the partition cylinder is in an interference fit with the hole of the partition plate; a gap is left between an outer wall of the partition cylinder and an inner wall of the outer magnetic cylinder; the outer magnetic cylinder has a stepped outer wall, and a diameter of an upper part of the stepped outer wall is smaller than that of a lower part of the stepped outer wall; the centering table is configured to perform axial positioning through the stepped outer wall of the outer magnetic cylinder; one end of the outer magnetic cylinder is fixedly arranged on an inner side of a first bearing seat through the first sliding bearing, and the other end of the outer magnetic cylinder is fixedly arranged on an inner side of a second bearing seat through the second sliding bearing; the first bearing seat and the second bearing seat are coaxial; the first bearing seat is fixedly arranged on the partition plate; and the second bearing seat is fixedly arranged on an inner end surface of the top sealing sleeve.

In an embodiment, the centering table comprises a mounting table, a centering ring, a first pin, a second pin, a third pin and a rotating seat;

the mounting table, the centering ring and the rotating seat are annular; the rotating seat is arranged on the outer magnetic cylinder; an upper end surface of the mounting table is radially provided with a clamping groove; the clamping groove is configured for matching a protrusion on an end surface of the first test piece to mount the first test piece; and a lower end surface of the mounting table is connected to the rotating seat through the third pin;

the rotating seat has a stepped outer wall; a diameter of an upper part of the rotating seat is smaller than that of a lower part of the rotating seat, and the upper part of the rotating seat is located in an inner hole of the mounting table; the centering ring is sleeved on the upper part of the rotating seat and connected with the rotating seat through the first pin; the mounting table is connected to the centering ring through the second pin; and the first pin and the second pin are arranged along a radial direction of the centering ring.

In an embodiment, the center hole of the top sealing sleeve is stepped; a diameter of a lower part of the center hole of the top sealing sleeve is larger than that of a middle part of the center hole, and the diameter of the middle part is larger than a diameter of an upper part of the center hole; an upper end of the partition cylinder is fixedly arranged in the lower part of the center hole of the top sealing sleeve; the first sealing bearing is fixedly arranged in the middle part; a third sealing ring is arranged between the upper part and the rotating shaft; an upper part of a side wall of the center hole of the top sealing sleeve is radially provided with a first leakage port; and the first leakage port is located between the first sealing bearing and the third sealing ring;

the top sealing sleeve is divided into an upper part, a middle part and a lower part; a diameter of the upper part of the top sealing sleeve is the smallest; the upper part of the top sealing sleeve is provided with a second leakage port; the second leakage port is communicated with the first leakage port; the middle part of the top sealing sleeve is provided with a thread; the middle part of the top sealing sleeve is threadedly connected with a second fastening nut through the thread; the lower part of the top sealing sleeve is configured to be tapered to fit the tapered hole; and the second sealing ring is arranged between the lower part of the top sealing sleeve and the tapered hole.

In an embodiment, the rotating shaft hole is arranged on the bottom plate of the tank body; the bottom sealing sleeve is sealedly welded to the position on the outer wall of the tank body where the rotating shaft hole is located; an inner hole of the bottom sealing sleeve is stepped; a diameter of an upper part of the inner hole of the bottom sealing sleeve is larger than that of a lower part of the inner hole of the bottom sealing sleeve; the upper part of the inner hole of the bottom sealing sleeve is sleeved on an outer side of the second sealing bearing; a third sealing ring is provided between the lower part of the inner hole of the bottom sealing sleeve and the rotating shaft; the lower part of the bottom cover is radially provided with a leakage port; and the leakage port is located between the third sealing ring and the second sealing bearing.

In an embodiment, an inner wall of the tank cover is fixed provided with a mounting table; the mounting table is annular; the mounting table and the centering table are coaxial; an end surface of the mounting table facing the centering table is provided with a clamping groove; and the clamping groove is configured to match a protrusion on an end surface of a second test piece to mount the second test piece.

In an embodiment, the third pin comprises a first outer sleeve, an elastic layer, an inner core and a second outer sleeve; the elastic layer is sleeved on an outer side wall of the inner core; a shaft shoulder is arranged in a middle of the elastic layer; the first outer sleeve and the second outer sleeve are sleeved on the elastic layer; the first outer sleeve is located on one side of the shaft shoulder, and the second outer sleeve is located on the other side of the shaft shoulder; the second outer sleeve and a pin hole on the rotating seat are in an interference fit; and the first outer sleeve and the pin hole on the mounting table are in a clearance fit.

In an embodiment, the centering ring is provided with four first pin holes; the four first pin holes are evenly distributed along a circumferential direction; an axis of each of the four first pin holes is arranged along the radial direction of the centering ring; the mounting table is provided with two second pin holes; the two second pin holes are coaxial; the two second pin holes are respectively connected to two of the four first pin holes through the second pin; the pin and the two of the four first pin holes are in a clearance fit; the pin and each of the two second pin holes are in an interference fit; the rotating seat is provided with two third pin holes; the two third pin holes are coaxial; the two third pin holes are respectively connected with the other two of the four first pin holes through the first pin; the first pin and the other two of the four first pin holes are in a clearance fit; and the first pin and each of the two third pin holes are in an interference fit.

In an embodiment, the positioning pin is in a clearance fit with a pin hole on the tank cover; the positioning pin is in an interference fit with a pin hole on the tank body; the partition cylinder is made of a non-metallic material; and the inner magnetic cylinder and the outer magnetic cylinder are both made of a strong magnetic material; a third sealing ring is arranged between the bottom sealing sleeve and the rotating shaft; the third leakage port is arranged on the bottom sealing sleeve; and the third leakage port is located above the third sealing ring.

Compared to the prior art, the present disclosure has the following beneficial effects.

1. The friction and wear testing platform of the present disclosure has a simple structure and reliable functions, and can simulate any real marine environment with negative pressure, ultra-high pressure and submarine silt, and thus can be applied to the accurate exploration of a friction and wear mechanism under a submarine environment.
2. By means of the permanent magnetic loading method, the friction and wear testing platform provided herein can ensure the absolute sealing of a test chamber, and also can attenuate the shock of the rotating shaft, so as to improve the accuracy of the test results. Moreover, the test chamber and the pressure compensation chamber are designed, and since the test chamber and the pressure compensation chamber almost have the same pressure, a smaller distance is enabled between the inner magnetic cylinder and the outer magnetic cylinder which are used to perform magnetic transmission, enhancing the power transmission efficiency and the loading capacity.
3. Due to the penetration through the whole high-pressure tank, the transmission shaft is not exposed to an axial force generated by the high-pressure seawater at an end of the rotating shaft, allowing for a larger axial loading force, a higher axial loading accuracy and a better rotating shaft stability.
4. Regarding the friction and wear testing platform provided herein, the contact seal is mostly replaced with the clearance seal, enabling a higher loading accuracy. In addition, a reduced leakage is demonstrated when using hydraulic oil as an object, further reducing a support resistance of the sealing bearing. Furthermore, heat sinks are arranged on the partition plate, thereby improving the heat dissipation efficiency.
5. The tank cover is provided with a tapered hole fitting the top sealing sleeve, thereby avoiding the difficulty in removing the cover caused by the transmission shaft running through the tank. In addition, the larger end of the conical surface is close to the test chamber, arriving at self-tightening sealing and ensuring the sealing reliability.
6. The centering table is provided with a centering ring to automatically and flexibly adjust a horizontal declination angle of the first test piece such that the uniform fit between the first test piece and the second test piece is always kept, so as to improve the test accuracy.
7. The reset pin can automatically level the mounting table, which improves a balance stability of the mounting table and facilitates the accurate exploration of the friction characteristics of the test piece. In addition, the inner core is configured to make the reset pin have a high bending strength; the rubber layer allows a high elasticity of the reset pin; and the first sleeve and the second sleeve enable the good friction characteristics of the reset pin, and improve the assembly of the reset pin in a high-pressure environment.

DETAILED DESCRIPTION OF EMBODIMENTS

The technical solutions of the present disclosure will be described completely and clearly below with reference to the accompanying drawings and embodiments.

Figure 1:
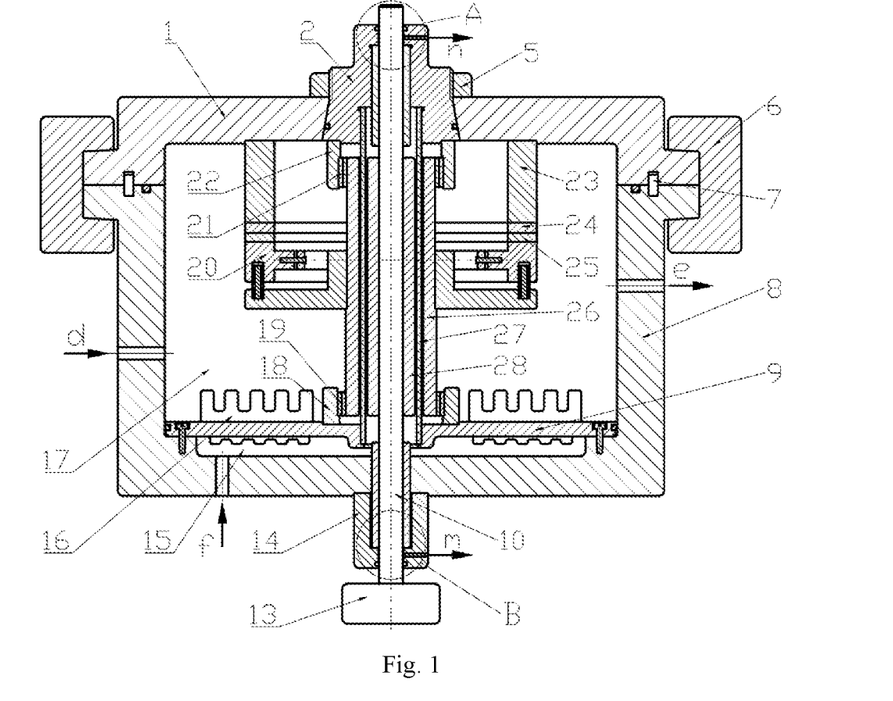
FIG. 1 is a front view of a friction and wear testing platform according to an embodiment of the present disclosure.

As shown in FIG. 1, a friction and wear testing platform capable of simulating high-pressure, silt-containing and turbid submarine environment is provided, which includes a high-pressure tank, a top sealing sleeve 2, a fastening nut 5, a clamp 6, a first positioning pin 7, a partition plate 9, a rotating shaft 10, a loading device 13, a bottom sealing sleeve 14, a pressure compensation chamber 15, a heat sink 16, a test chamber 17, a first bearing seat 18, a first sliding bearing 19, a centering table 20, a second sliding bearing 21, a second bearing seat 22, a mounting table 23, a second test piece 24, a first test piece 25, an outer magnetic cylinder 26, a partition cylinder 27, and an inner magnetic cylinder 28.

The high-pressure tank includes a tank cover 1 and a tank body 8. The tank cover 1 is installed at an opening of the tank body 8 through the first positioning pin 7. The first positioning pin 7 is in a clearance fit with a pin hole on the tank cover 1, and is in an interference fit with a pin hole on the tank body 8. A first sealing ring is provided between the tank cover 1 and the tank body 8. The tank cover 1 and the tank body 8 are fixedly connected via the clamp 6. The partition plate 9 is provided with the heat sink 16. The partition plate 9 is fixedly arranged in the tank body 8 to divide an inner chamber of the high-pressure tank into the test chamber 17 and the pressure compensation chamber 15. A side wall of the test chamber 17 is provided with a water inlet d and a gas discharge port e. The water inlet d and the gas discharge port e are arranged on a side wall of the tank body 8. The pressure compensation chamber 15 is provided with an oil inlet f, and the oil inlet f is arranged on a bottom plate of the tank body 8.

A center of the tank cover 1 is provided with a tapered hole. A large circle of the tapered hole is close to the test chamber 17. The top sealing sleeve 2 is arranged in the tapered hole and fixed by a fastening nut 5. A second sealing ring is arranged between the top sealing sleeve 2 and the tapered hole. A center of the partition plate 9 is provided with a hole coaxial with the top sealing sleeve 2. One end of the partition cylinder 27 is fixedly arranged in the hole of the partition plate 9, and the other end of the partition cylinder 27 is fixedly arranged in a hole of the top sealing sleeve 2.

The bottom plate of the tank body 8 is provided with a rotating shaft hole. The rotating shaft hole is coaxial with the bottom sealing sleeve 14. The bottom sealing sleeve 14 is arranged on a position of an outer wall of the tank body 8 where the rotating shaft hole is located. One end of the rotating shaft 10 is supported in a center hole of the top sealing sleeve 2 through a first sealing bearing 3, and the other end of the rotating shaft 10 is configured to pass through the partition cylinder 27, the partition plate 9 and the bottom sealing sleeve 14 to be connect to the loading device 13. The rotating shaft 10 is supported in the rotating shaft hole and a hole of the bottom sealing sleeve 14 through a second sealing bearing 11.

The inner magnetic cylinder 28 is sleeved on the rotating shaft 10. The outer magnetic cylinder 26 is sleeved on the partition cylinder 27. A gap is left between an outer wall of the inner magnetic cylinder 28 and an inner wall of the partition cylinder 27. One end of the outer magnetic cylinder 26 is fixedly arranged on the partition plate 9 through the first sliding bearing 19, and the other end of the outer magnetic cylinder 26 is fixedly arranged on the top sealing sleeve 2 through the second sliding bearing 21. The first sliding bearing 19 is fixedly arranged at an inner side of the first bearing seat 18. The second sliding bearing 21 is fixedly arranged at an inner side of the second bearing seat 22. The first bearing seat 18 and the second bearing seat 22 are coaxial. The first bearing seat 18 is fixedly arranged on the partition plate 9. The second bearing seat 22 is fixedly arranged on an inner end surface of the top sealing sleeve 2. The centering table 20 is fixedly arranged on the outer magnetic cylinder 26, and is located in the test chamber 17. An outer wall of the outer magnetic cylinder 26 is stepped, and a diameter of an upper part of the outer wall is smaller than that of a lower part of the outer wall. The centering table 20 is configured to perform axial positioning through a stepped surface of the outer magnetic cylinder 26, and is also configured to install a first test piece 25. The mounting table 23 is fixed on an inner wall of the tank cover 1, and is annular. The mounting table 23 is coaxial with the centering table 20. An end surface of the mounting table 23 facing the centering table 20 is provided with a first clamping groove, which is configured for fitting a protrusion on an end surface of the second test piece 24 to mount the second test piece 24. The second test piece 24 is coaxial with the first test piece 25. The partition cylinder 27 is made of a non-metallic material. The inner magnetic cylinder 28 and the outer magnetic cylinder 26 are made of a strong magnetic material.

Figure 4:
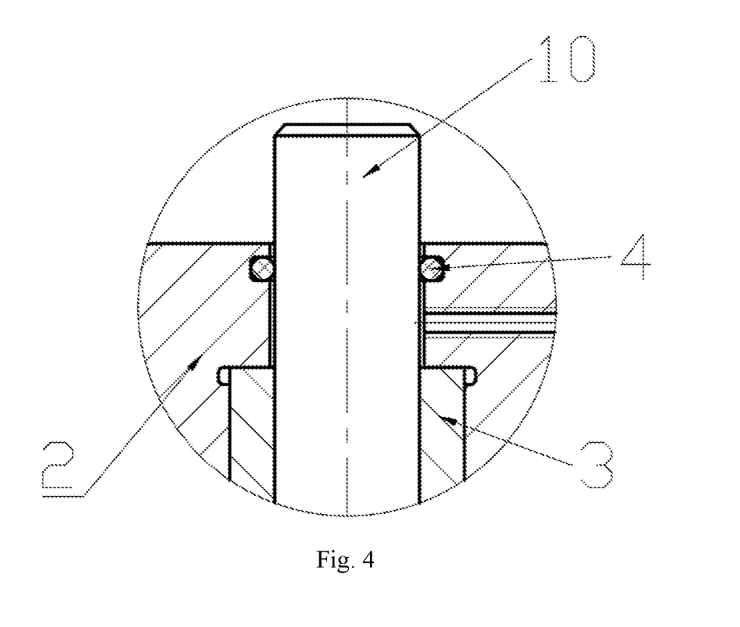
FIG. 4 is an enlarged view of part A in FIG. 1.

As shown in FIGS. 1 and 4, the center hole of the top sealing sleeve 2 is stepped. A diameter of a lower part of the center hole is larger than that of a middle part of the center hole, and a diameter of the middle part of the center hole is larger than that of an upper part of the center hole. An upper end of the partition cylinder 27 is fixedly arranged in the lower part of the center hole of the top sealing sleeve 2. The first sealing bearing 3 is fixedly arranged in the middle part of the center hole of the top sealing sleeve 2. A third sealing ring 4 is arranged between the upper part of the center hole of the top sealing sleeve 2 and the rotating shaft 10. An upper part of a side wall of the center hole of the top sealing sleeve 2 is radially provided with a first leakage port. The first leakage port is located between the first sealing bearing 3 and the third sealing ring 4. The top sealing sleeve 2 is divided into an upper part, a middle part and a lower part, where the upper part has the smallest diameter, and is provided with a second leakage port n communicated with the first leakage port. The middle part of the top sealing sleeve 2 is provided with a thread, and is threadedly connected with the fastening nut 5 via the thread. The fastening nut 5 abuts against the tank cover 1 therebelow. The lower part of the top sealing sleeve 2 is configured to be tapered to match the tapered hole. The second sealing ring is arranged between the lower part of the top sealing sleeve 2 and the tapered hole.

Figure 5:
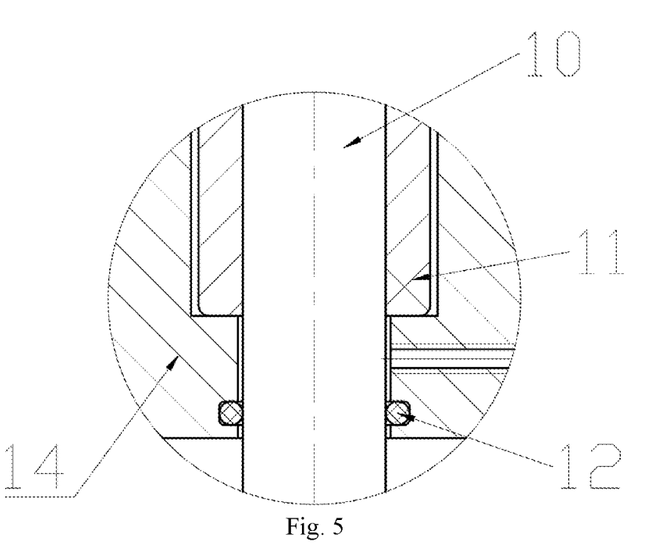
FIG. 5 is an enlarged view of part B in FIG. 1.

As shown in FIG. 5, the second sealing bearing 11 is in a clearance fit with the rotating shaft 10, and a clearance seal is formed between the second sealing bearing 11 and the rotating shaft 10. A fourth sealing ring 12 is provided between the bottom sealing sleeve 14 and the rotating shaft 10 to prevent the hydraulic oil from leaking to a position below the bottom sealing sleeve 14. The bottom sealing sleeve 14 is provided with a third leakage port m, which is located above the fourth sealing ring 12, such that the hydraulic oil leaking from the gap between the second sealing bearing 11 and the rotating shaft 10 will flow into a recovery oil tank through the third leakage port m.

Figure 2:
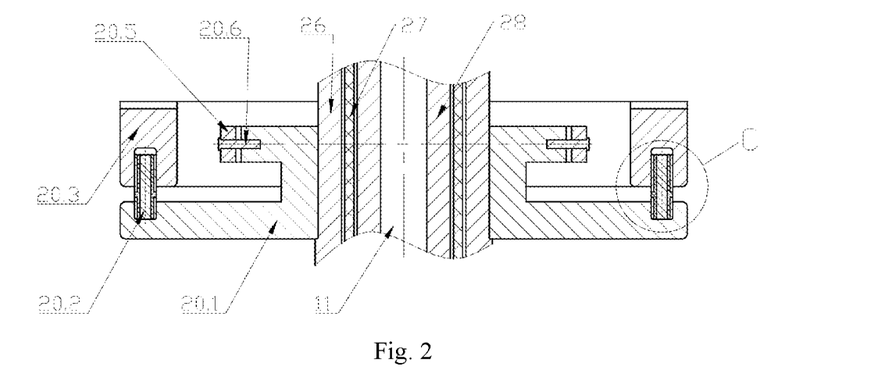
FIG. 2 is a left side view of a centering table of the friction and wear testing platform according to an embodiment of the present disclosure.
Figure 3:
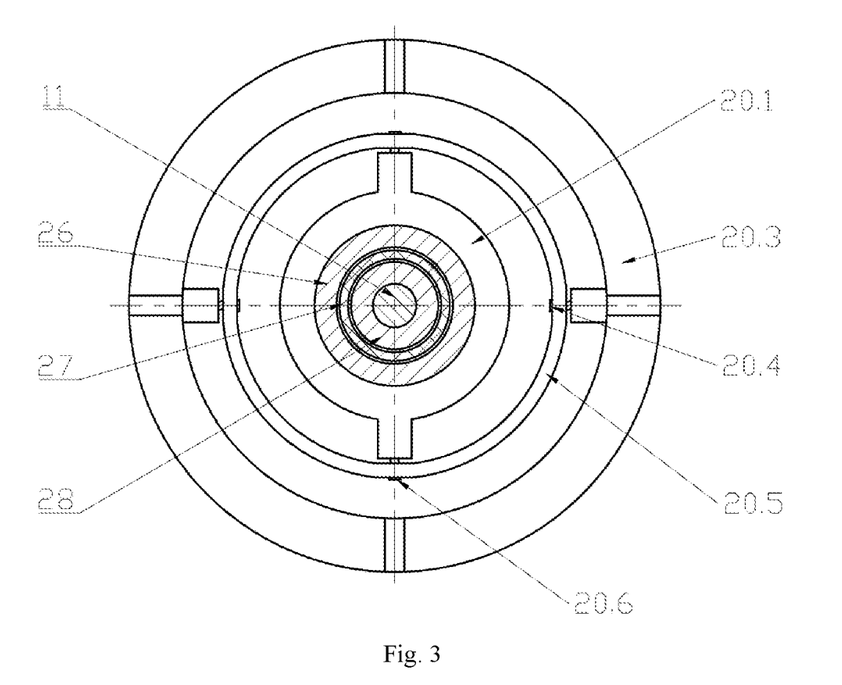
FIG. 3 is a top view of the centering table according to an embodiment of the present disclosure.

As shown in FIGS. 2 and 3, the centering table 20 includes a rotating seat 201, a reset pin 202, a mounting table 203, a pin 204, a centering ring 205, and a second positioning pin 206.

The mounting table 203, the centering ring 205 and the rotating seat 201 are annular. The rotating seat 201 is arranged on the outer magnetic cylinder 26. An upper end surface of the mounting table 203 is radially provided with a second clamping groove, which is configured for matching a protrusion on an end surface of the first test piece 25 to mount the first test piece 25. A lower end surface of the mounting table 203 is connected to the rotating seat 201 through the reset pin 202. An axis of the reset pin 202 is parallel to an axis of the mounting table 203. The rotating seat 201 has a stepped outer wall with a diameter of an upper part smaller than that of a lower part. The upper part of the rotating seat 201 is arranged in an inner hole of the mounting table 203. The centering ring 205 is sleeved on the upper part of the rotating seat 201, and connected with the rotating seat 201 through the second positioning pin 206. The mounting table 203 is connected to the centering ring 205 through the pin 204. The second positioning pin 206 and the pin 204 are arranged along a radial direction of the centering ring 205.

The centering ring 205 is provided with four first pin holes, which are evenly arranged along a circumferential direction. An axis of each of the four first pin holes is arranged along the radial direction of the centering ring 205. The mounting table 203 is provided with two second pin holes which are coaxial. The two second pin holes on the mounting table 203 are respectively connected with two of the four first pin holes on the centering ring 205 through the pin 204, where the pin 204 is in a clearance fit with the two first pin holes on the centering ring 205, and in an interference fit with the two second pin holes on the mounting table 203. The rotating seat 201 is provided with two third pin holes, which are coaxial, and respectively connected with the other two first pin holes on the centering ring 205 through the second positioning pin 206. The second positioning pin 206 is in a clearance fit with the other two first pin holes on the centering ring 205, and is in an interference fit with the two third pin holes.

During the working process of the centering table 20, the outer magnetic cylinder 26 drives the rotating seat 201 to rotate, and then the rotating seat 201 drives the centering ring 205 to rotate through the second positioning pin 206 in the third pin hole. As a consequence, the centering ring 205 drives the mounting table 203 to rotate through the pin 204. Since an axis of the pin 204 connecting the mounting table 203 with the centering ring 205 is perpendicular to an axis of the second positioning pin 206 connecting the rotating seat 201 with the centering ring 205; the pin 204 is in an interference fit with the second pin hole on the mounting table 203 and the third pin hole on the rotating seat 201; and the second positioning pin 206 and the pin 204 are both in a clearance fit with the first pin hole on the centering ring 205, the declination angle can be flexibly adjusted by the mounting table 203 to make a contact surface between the first test piece 25 and the second test piece 24 suffer a uniform load.

Figure 6:
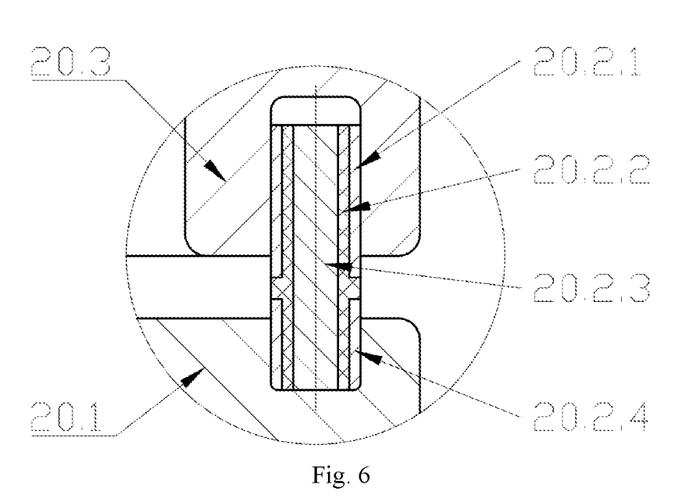
FIG. 6 is an enlarged view of part C in FIG. 2.

As shown in FIGS. 2 and 6, the reset pin 202 includes a first outer sleeve 2021, an elastic layer 2022, an inner core 2023 and a second outer sleeve 2024. The elastic layer 2022 is sleeved on an outer side wall of the inner core 2023. A shaft shoulder is arranged in the middle of the elastic layer 2022. The first outer sleeve 2021 and the second outer sleeve 2024 are both sleeved on the elastic layer 2022. The first outer sleeve 2021 is located on one side of the shaft shoulder, and the second outer sleeve 2024 is located on the other side of the shaft shoulder.

The inner core 2023 has a high strength, which ensures a desirable anti-bending performance of the reset pin 202. The elastic layer 2022 has a high elasticity, which allows a high elasticity of the reset pin 202. The first outer sleeve 2021 and the second outer sleeve 2024 of the reset pin 202 have a high hardness, which enables good friction characteristics of the reset pin 202. The first outer sleeve 2021 is in a clearance fit with the second pin hole on the mounting table 203, such that when the mounting table 203 is tilted, the reset pin 202 can move freely in the second pin holes on the mounting table 203, resulting in a misalignment of an axis of the first outer sleeve 2021 with an axis of the second outer sleeve 2024. Under the action of the elastic layer 2022, the first outer sleeve 2021 and the second outer sleeve 2024 tend to be coaxial, and a larger restoring force is generated with respect to a more serious misalignment. In this case, the mounting table 203 always has a tendency to remain level, allowing for an enhanced balance stability facilitating the precise exploration of the friction characteristics between the first test piece 25 and the second test piece 24.

Since a declination angle of the mounting table 203 is small during the working process, the restoring force generated by the reset pin 202 can be ignored for the precise study of the friction characteristics of the test pieces. The elastic characteristics of the reset pin 202 mainly depend on thickness, material and shape of the elastic layer. The leveling characteristic of the mounting table 203 can be improved by changing parameters of the inner core 2023, the second outer sleeve 2024 and the first outer sleeve 2021 of the reset pin 202 to enhance the accuracy of the friction test.

When the testing platform of the disclosure is applied to the friction and wear test under a silt-containing submarine environment, the fastening nut 5 and the clamp 6 are first loosened, and then the tank cover 1 is removed. The silt particles are added to the test chamber 17, and the first test piece 25 and the second test piece 24 are loaded, and then the tank cover 1 is covered. During the process of installing the tank cover 1, it is necessary to align the first positioning pin 7. The first positioning pin 7 is fixedly arranged in the pin hole on the tank body 8, and is in a clearance fit with the pin hole on the tank cover 1, which can facilitate the installation and positioning, and can prevent particles from entering the pin holes on the tank body 8 to avoid affecting the assembly accuracy. Finally, the clamp 6 and the fastening nut 5 are fastened. Next, the test chamber 17 is filled with seawater through the water inlet d, and the air is discharged from the gas discharge port e at the same time, eventually allowing the test chamber 17 to be filled with the silt-containing seawater. Then the hydraulic oil is fed into the pressure compensation chamber 15 through the oil inlet f, and the air can be discharged through the third leakage port m and the first leakage port. When the pressure compensation chamber 15 is filled with the hydraulic oil, the gas discharge port e is blocked, and the hydraulic oil is continuously fed to the pressure compensation chamber 15. At the same time, the hydraulic oil leaking from the third leakage port and the first leakage port is guided into the oil recovery tank, so as to make the pressure compensation chamber 15 and the test chamber 17 have the same pressure, and experience a synchronous increase. When the pressure in the test chamber 17 reaches the test condition, the loading device 13 can be turned on to carry out the friction test.

The loading device 13 drives the rotating shaft 10 to rotate, and then the rotating shaft 10 drives the inner magnetic cylinder 28 to rotate. As a consequence, the inner magnetic cylinder 28 drives the outer magnetic cylinder 26 to rotate, and the outer magnetic cylinder 26 drives the centering table 20 to move, so as to allow the first test piece 25 and the second test piece 24 to rub against each other. There is a gap between the inner magnetic cylinder 28, the partition cylinder 27 and the outer magnetic cylinder 26. The inner magnetic cylinder 28 and the outer magnetic cylinder 26 are driven by a magnetic coupling, and the magnetic transmission efficiency can be adjusted by changing the gap between the inner magnetic cylinder 28, the partition cylinder 27 and the outer magnetic cylinder 26 and a thickness of the partition cylinder 27. The outer magnetic cylinder 26 is directly positioned by the first sliding bearing 19 and the second sliding bearing 21. The first sliding bearing 19 and the second sliding bearing 21 do not provide an axial thrust, so that the outer magnetic cylinder 26 can freely rotate and move up and down along a fixed axis. An outer circle of the outer magnetic cylinder 26 is stepped, and the centering table 20 is fixedly arranged on an outer side of the outer magnetic cylinder 26. At the same time, a stepped end surface of the outer magnetic cylinder 26 abuts against a lower end surface of the centering table 20, so that the outer magnetic cylinder 26 can provide a larger axial force to the centering table 20 and an axial positioning accuracy of the centering table 20 is enabled.

What is claimed is:

1. A friction and wear testing platform capable of simulating a high-pressure, silt-containing and turbid submarine environment, comprising:
   a tank;
   a loading device;
   a partition plate;
   a partition cylinder;
   a top sealing sleeve;
   a bottom sealing sleeve;
   a rotating shaft;
   an inner magnetic cylinder;
   an outer magnetic cylinder; and
   a centering table;
   wherein the top sealing sleeve and the bottom sealing sleeve are coaxially provided on the tank;
   the partition plate is fixedly arranged in the tank to divide an inner chamber of the tank into a test chamber and a pressure compensation chamber; the test chamber is provided with a water inlet and a gas discharge port; the pressure compensation chamber is provided with an oil inlet; the partition plate is provided with a hole coaxial with the top sealing sleeve; and one end of the partition cylinder is fixedly arranged in the hole of the partition plate, and the other end of the partition cylinder is fixedly arranged in a center hole of the top sealing sleeve;

the tank is provided with a rotating shaft hole; the rotating shaft hole is coaxial with the bottom sealing sleeve; the bottom sealing sleeve is arranged at a position of an outer wall of the tank where the rotating shaft hole is located; one end of the rotating shaft is supported in a hole of the top sealing sleeve via a first sealing bearing, and the other end of the rotating shaft is configured to pass through the partition cylinder, the partition plate, and the bottom sealing sleeve to be connected to the loading device; the rotating shaft is supported in the rotating shaft hole and a center hole of the sealing sleeve via a second sealing bearing; the inner magnetic cylinder is sleeved on the rotating shaft; the outer magnetic cylinder is sleeved on the partition cylinder; a gap is left between an outer wall of the inner magnetic cylinder and an inner wall of the partition cylinder; one end of the outer magnetic cylinder is fixedly arranged on the partition plate through a first sliding bearing, and the other end of the outer magnetic cylinder is fixedly arranged on the top sealing sleeve through a second sliding bearing; the centering table is fixedly arranged on the outer magnetic cylinder, and is located in the test chamber; and the centering table is configured to install a first test piece.

2. The friction and wear testing platform of claim 1, wherein the tank comprises a tank cover and a tank body; the tank cover is arranged at an opening of the tank body via a positioning pin; a first sealing ring is arranged between the tank cover and the tank body; the tank cover and the tank body are fixedly connected via a clamp; a center of the tank cover is provided with a tapered hole; a larger end of the tapered hole is close to the test chamber; the top sealing sleeve is arranged in the tapered hole, and fixed via a first fastening nut; a second sealing ring is arranged between the top sealing sleeve and the tapered hole; the water inlet and the gas discharge port are arranged on a side wall of the tank body; the oil inlet is arranged on a bottom plate of the tank body; the partition plate is parallel to the bottom plate of the tank body; a heat sink is arranged on the partition plate; and the hole of the partition plate is located at a center of the partition plate.

3. The friction and wear testing platform of claim 2, wherein the center hole of the top sealing sleeve is stepped; a diameter of a lower part of the center hole of the top sealing sleeve is larger than that of a middle part of the center hole of the top sealing sleeve, and a diameter of the middle part of the top sealing sleeve is larger than that of an upper part of the center hole of the top sealing sleeve; an upper end of the partition cylinder is fixedly arranged in the lower part of the center hole of the top sealing sleeve; the first sealing bearing is fixedly arranged in the middle part of the top sealing sleeve; a third sealing ring is arranged between the upper part the top sealing sleeve and the rotating shaft; an upper part of a side wall of the center hole of the top sealing sleeve is radially provided with a first leakage port; and the first leakage port is located between the first sealing bearing and the third sealing ring;

the top sealing sleeve is divided into an upper part, a middle part and a lower part; a diameter of the upper part of the top sealing sleeve is the smallest; the upper part of the top sealing sleeve is provided with a second leakage port; the second leakage port is communicated with the first leakage port; the middle part of the top sealing sleeve is provided with a thread; the middle part of the top sealing sleeve is threadedly connected with a second fastening nut through the thread; the lower part of the top sealing sleeve is configured to be tapered to fit the tapered hole on the tank cover; and the second sealing ring is arranged between the lower part of the top sealing sleeve and the tapered hole of the tank cover.

4. The friction and wear testing platform of claim 2, wherein the rotating shaft hole is arranged on the bottom plate of the tank body; the bottom sealing sleeve is sealedly welded to the position on the outer wall of the tank body where the rotating shaft hole is located; an inner hole of the bottom sealing sleeve is stepped; a diameter of an upper part of the inner hole of the bottom sealing sleeve is larger than that of a lower part of the inner hole of the bottom sealing sleeve; the upper part of the inner hole of the bottom sealing sleeve is sleeved on an outer side of the second sealing bearing; a third sealing ring is provided between the lower part of the inner hole of the bottom sealing sleeve and the rotating shaft; a lower part of the bottom cover is radially provided with a leakage port; and the leakage port is located between the third sealing ring and the second sealing bearing.

5. The friction and wear testing platform of claim 2, wherein an inner wall of the tank cover is fixedly provided with a mounting table; the mounting table is annular; the mounting table and the centering table are coaxial; an end surface of the mounting table facing the centering table is provided with a clamping groove; and the clamping groove is configured to fit a protrusion on an end surface of a second test piece to mount the second test piece.

6. The friction and wear testing platform of claim 2, wherein the positioning pin is in a clearance fit with a pin hole on the tank cover; the positioning pin is in an interference fit with a pin hole on the tank body; the partition cylinder is made of a non-metallic material; and the inner magnetic cylinder and the outer magnetic cylinder are both made of a strong magnetic material.

7. The friction and wear testing platform of claim 1, wherein an end of the partition cylinder is in an interference fit with the hole of the partition plate; a gap is left between an outer wall of the partition cylinder and an inner wall of the outer magnetic cylinder; the outer magnetic cylinder has a stepped outer wall, and a diameter of an upper part of the stepped outer wall is smaller than that of a lower part of the stepped outer wall; the centering table is configured to perform axial positioning through the stepped outer wall of the outer magnetic cylinder; one end of the outer magnetic cylinder is fixedly arranged on an inner side of a first bearing seat through the first sliding bearing, and the other end of the outer magnetic cylinder is fixedly arranged on an inner side of a second bearing seat through the second sliding bearing; the first bearing seat and the second bearing seat are coaxial; the first bearing seat is fixedly arranged on the partition plate; and the second bearing seat is fixedly arranged on an inner end surface of the top sealing sleeve.

8. The friction and wear testing platform of claim 1, wherein the centering table comprises a mounting table, a centering ring, a first pin, a second pin, a third pin and a rotating seat;

the mounting table, the centering ring and the rotating seat are annular; the rotating seat is arranged on the outer magnetic cylinder; an upper end surface of the mounting table is radially provided with a clamping groove; the clamping groove is configured for matching a protrusion on an end surface of the first test piece to mount the first test piece; and a lower end surface of the mounting table is connected to the rotating seat through the third pin;

the rotating seat has a stepped outer wall; a diameter of an upper part of the rotating seat is smaller than that of a lower part of the rotating seat, and the upper part of the rotating seat is located in an inner hole of the mounting table; the centering ring is sleeved on the upper part of the rotating seat, and connected with the rotating seat through the first pin; the mounting table is connected to the centering ring through the second pin; and the first pin and the second pin are arranged along a radial direction of the centering ring.

9. The friction and wear testing platform of claim 8, wherein the third pin comprises a first outer sleeve, an elastic layer, an inner core and a second outer sleeve; the elastic layer is sleeved on an outer side wall of the inner core; a shaft shoulder is arranged in a middle of the elastic layer; the first outer sleeve and the second outer sleeve are sleeved on the elastic layer; the first outer sleeve is located on one side of the shaft shoulder, and the second outer sleeve is located on the other side of the shaft shoulder; the second outer sleeve is in an interference fit with a pin hole on the rotating seat; and the first outer sleeve is in a clearance fit with a pin hole on the mounting table.

10. The friction and wear testing platform of claim 8, wherein the centering ring is provided with four first pin holes; the four first pin holes are evenly distributed along a circumferential direction; an axis of each of the four first pin holes is arranged along the radial direction of the centering ring; the mounting table is provided with two second pin holes; the two second pin holes are coaxial; the two second pin holes are respectively connected to two of the four first pin holes through the second pin; the pin and the two of the four first pin holes are in a clearance fit; the pin and each of the two second pin holes are in an interference fit; the rotating seat is provided with two third pin holes; the two third pin holes are coaxial; the two third pin holes are respectively connected with the other two of the four first pin holes through the first pin; the first pin and the other two of the four first pin holes are in a clearance fit; and the first pin and each of the two third pin holes are in an interference fit.

* * * * *